United States Patent
Chabanne et al.

[19]

[11] Patent Number: 6,155,626
[45] Date of Patent: Dec. 5, 2000

[54] REMOVABLE, REVERSIBLE AND LONGITUDINALLY ADJUSTABLE VEHICLE SEAT

[75] Inventors: Jean-Pierre Chabanne, Champvallon; Jean Duchateau, Pont Salomon, both of France

[73] Assignee: Grupo Antolin-Ingeneria, SA, Burgos, Spain

[21] Appl. No.: 09/233,024

[22] Filed: Jan. 20, 1999

[30]     Foreign Application Priority Data

Jan. 27, 1998 [FR] France ................................. 98 01116

[51] Int. Cl.[7] ........................................................ B60N 2/12
[52] U.S. Cl. ................................... 296/65.03; 296/65.13; 297/130; 248/503.1
[58] Field of Search .......................... 296/65.03, 65.05, 296/65.09, 65.13; 297/130, 311, 331, 344.11; 248/429, 503.1

[56]             References Cited

U.S. PATENT DOCUMENTS

| | | | |
|---|---|---|---|
| 3,899,151 | 8/1975 | Kobrehel ............................... | 248/429 |
| 4,742,984 | 5/1988 | Cote et al. ............................ | 248/503.1 |
| 4,759,580 | 7/1988 | Berklich, Jr. et al. ................ | 296/65 R |
| 5,280,987 | 1/1994 | Miller ..................................... | 296/65.1 |
| 5,330,245 | 7/1994 | Boisset ................................... | 296/65.1 |
| 5,711,505 | 1/1998 | Nemoto .................................. | 248/424 |
| 5,833,203 | 11/1998 | Denis et al. .......................... | 248/503.1 |
| 5,921,606 | 7/1999 | Moradell et al. ..................... | 296/65.03 |
| 5,961,088 | 10/1999 | Chabanne et al. ..................... | 248/429 |

FOREIGN PATENT DOCUMENTS

| | | |
|---|---|---|
| 0 537 078 A1 | 4/1993 | European Pat. Off. . |
| 0 609 130 A1 | 8/1994 | European Pat. Off. . |
| 0 749 864 A1 | 12/1996 | European Pat. Off. . |
| 2 556 946 A1 | 6/1985 | France . |
| 2 702 717 A1 | 9/1994 | France . |
| 40-4-271931 | 9/1992 | Japan ................................. 296/65.13 |
| 2 008 938 | 6/1979 | United Kingdom . |
| WO 92/02384 | 2/1992 | WIPO . |

*Primary Examiner*—D. Glenn Dayoan
*Assistant Examiner*—Paul Chenevert
*Attorney, Agent, or Firm*—Oliff & Berridge, PLC

[57]             ABSTRACT

Each of the legs of the seat comprises at least one transversely projecting part forming a retaining member, while the corresponding runner comprises, in its region that accommodates each leg, at least one hook-shaped catch articulated to it and capable of retracting as the projection of the corresponding leg is introduced into the runner, before coming back to hook onto this projection under the action of its return spring action, the manual latches of unlocking the catches being borne by each of the legs.

11 Claims, 8 Drawing Sheets

REMOVABLE, REVERSIBLE AND LONGITUDINALLY ADJUSTABLE VEHICLE SEAT

BACKGROUND OF THE INVENTION

The invention relates to a removable, reversible and longitudinally adjustable vehicle seat.

It is aimed more particularly, although not exclusively, at seats used in vehicles, the cabin of which can be converted to be adapted to suit the number of people to be carried, altering the number of seats and/or spacing between the seats, or to increase the area reserved for luggage or cargo by removing certain seats. This occurs, for example, in vehicles known as MPVs, where certain seats can be turned round.

It also relates to the adapting of these seats to the new technical constraints that dictate that each of these seats must be equipped with the anchoring points for the safety belt and that their structure and attachments to the floor must be capable of resisting the energy of an impact of defined characteristics.

DESCRIPTION OF THE PRIOR ART

According to a first known attachment technique, each removable seat is equipped, for example as described in FR-A-2 556 946 and U.S. Pat. No. 4,759,580, with four fork-shaped legs, some of which are fitted with catches, with their means of return to the locked position and their means of manual operation.

When the seat is not longitudinally adjustable, the forks fit over transverse rods formed in wells in the floor of the vehicle, whereas when it is adjustable and is arranged on runners that can move and be immobilized with respect to slideways fixed to the floor, the forks cooperate with complementary means borne by the runners, as described in FR-A-2 702 717.

With this method of attachment, each leg is equipped with its positioning and attachment means, and also with its locking means. This presents the drawback of making the seat heavier, increasing the human effort needed for taking it out of the vehicle, for example for storing it.

It will be noted that this weight constraint leads to the cross section of the catches, and therefore their strength, being limited.

When this type of seat is in the storage position, at least its front legs project from the seat cushion and therefore form projections which may become snagged with the risk of damaging the catches. Added to this is the possibility of the catches becoming soiled during storage out of the vehicle.

In a second manufacturing technique described in GB-A-2 008 938, four legs are in the shape of tenons, each capable of cooperating with complementary attachment means borne by the runner, which also bears the means of locking these tenons. This simplifies the construction and lightens the legs, while at the same time eliminating the risks of damage and soiling. However, this device is not strong enough to attach a seat that bears the anchoring points for a safety belt, as is now demanded for removable, reversible and adjustable seats.

SUMMARY OF THE INVENTION

The object of the present invention is therefore to provide a removable, reversible and longitudinally adjustable seat employing tenon-shaped legs, which are therefore not very prone to soiling or damage, and whose connection with the runners allows the desired resistance to be obtained.

To this end, in the seat according to the invention, each of the legs comprises at least one transversely projecting part forming a retaining member, while the corresponding runner comprises, in its region that accommodates each leg, at least one hook-shaped catch articulated to it and capable of retracting as the projection of the corresponding leg is introduced into the runner, before coming back to hook onto this projection under the action of its return means, and the manual means of unlocking the catches are borne by each of the legs.

Thus, each leg is rid of the fragile components that are the catches, because these catches are borne by the runner. These catches may have a large strong cross section without this making the seat heavier and may thus hold the seat and the passenger in place even in the event of impact. The same is true of the projection or projections with which each leg is fitted and which may have a large strong cross section.

In one embodiment of the invention, each of the legs bears, above its lower end, two transverse cylindrical retaining fingers spaced longitudinally, while each runner comprises, in each of its two regions for accommodating a leg, two C-shaped catches mounted in opposition and with the possibility of rotation on two transverse pins, these two pins passing through the runner and bearing on their ends, protruding from the runner, rollers that roll in longitudinal grooves of the slideways.

In this arrangement, the catch pins, which can be oversized, hold the catches in place excellently, both in normal operation and in the event of an impact. This is because in the latter instance, when the energy of the impact tends, through the force imparted to the seat, to extract the retaining fingers from the hooks, these hooks are well able to resist, especially since the force they experience is spread by their articulation pin not only over the runner and through it over the slideway, but also by the rollers fixed to the ends of these pins in the grooves of the slideway. In other words, this assembly improves the resisting surfaces involved in the case of a pulling-out force and increases the overall resistance of the connection between the seat and its slideways fixed to the floor.

Advantageously, the means of immobilizing each runner in its slideway comprise:

in the runner, at least one lever articulated to the runner about a transverse pin, and of which one end, passing through the bottom of the runner is toothed to correspond with the teeth of a rack attached in the bottom of the slideway, and a rocker capping the lever, arranged in the runner and bearing a transverse pin for connection with the other end of the aforementioned lever, this rocker being equipped at each end with lateral projections that are mounted so that they can slide in vertical slots in the runner, and with sprung means that press said projections against the upper end of the slots, keeping the teeth of the lever engaged in the rack, and, on the seat-cushion structure, a pusher capable of coming over the rocker of the runner and projecting more or less vertically downward from the inside branch of a lever, said lever being articulated to the seat-cushion structure and comprising an outside branch forming an operating handle, said outside branch of the lever being coupled to the inside branch of another operating lever articulated to the same seat-cushion structure but operable from the other side of the seat.

Thus, irrespective of the position, facing forward or facing backward, of the seat with respect to the runner, it is still possible for its longitudinal position to be altered, and therefore for the runners to be moved in the slideways, by operating one or other of the controls provided for this on the front or rear part of the seat cushion. This arrangement is particularly advantageous because it makes it possible, when faced with the need to increase the space reserved for luggage, to move the seats by actuating them from the rear of the vehicle without having to get in through the side doors in order to actuate the control for unlocking the runners, which control is generally placed only under the front part of the seat.

BRIEF DESCRIPTION OF THE DRAWINGS

Other features and advantages will emerge from the description which follows with reference to the appended diagrammatic drawing which depicts, by way of example, one embodiment of the seat according to the invention.

DESCRIPTION OF THE PREFERRED EMBODIMENT

Figure 11:
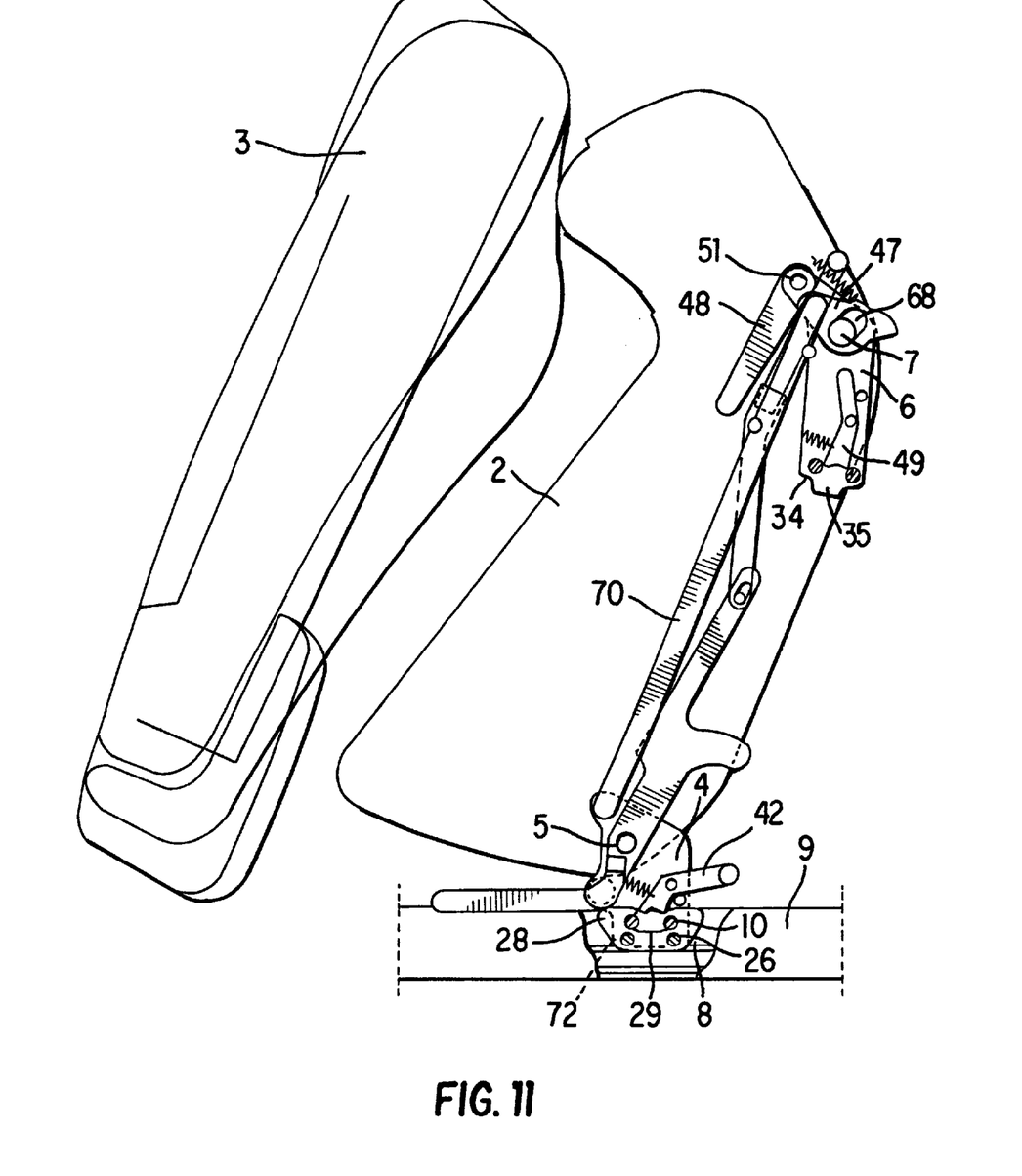
FIG. 11 is a diagrammatic view of the seat when it is in the folded-forward position.

In this drawing, the numerical reference 2 denotes, in general, the seat cushion to which there is articulated, by means which are known and outside of the remit of the invention, a backrest structure 3, visible in FIG. 11. The seat-cushion structure bears, in the known way, two front legs 4 which are articulated to it about a transverse pin 5, and two rear legs 6 which are articulated to it about a transverse pin 7. Each of these legs comprises attachment means intended to cooperate with complementary means arranged in a runner 8 that can be moved and immobilized with respect to a slideway 9 fixed to the floor of the vehicle.

According to the invention, each of the legs 4 and 6 is in the shape of a tenon and bears retaining means intended to cooperate with complementary locking means arranged in the runner 8.

Figure 4:
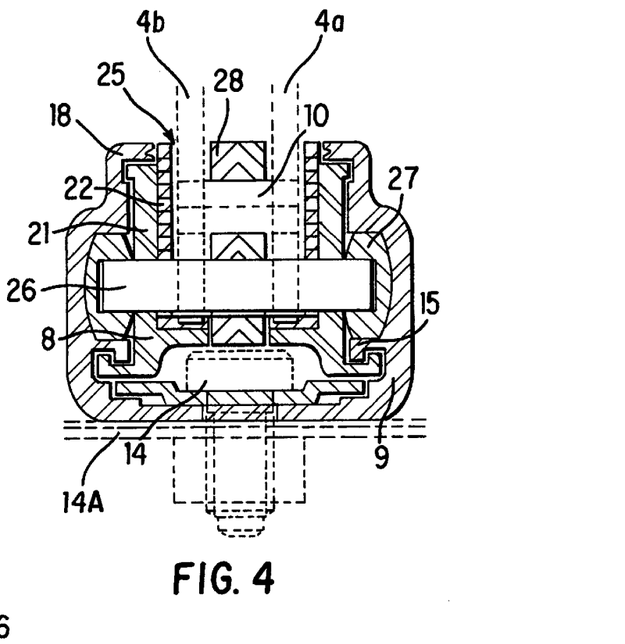

In the embodiment depicted, each leg consists of two metal tangs 4a, 4b, visible in FIG. 4, which are spaced apart and connected by two cylindrical fingers 10 forming retaining members. These fingers are arranged transversely to the direction of travel of the seat. They are spaced longitudinally from one another by a distance d in FIG. 1 and are above the lower end face 4d of the corresponding leg, as shown by the distance S in FIG. 1. The retaining fingers 10 are of course solidly attached to the two tangs that form the leg 4, for example by welding.

Before examining the means with which these fingers cooperate, a description of the means of adjusting the longitudinal position of the seat and in particular of one of the slideways 9 and the runner 8 associated with it will be given, with reference to FIGS. 3 to 5.

Figure 2:
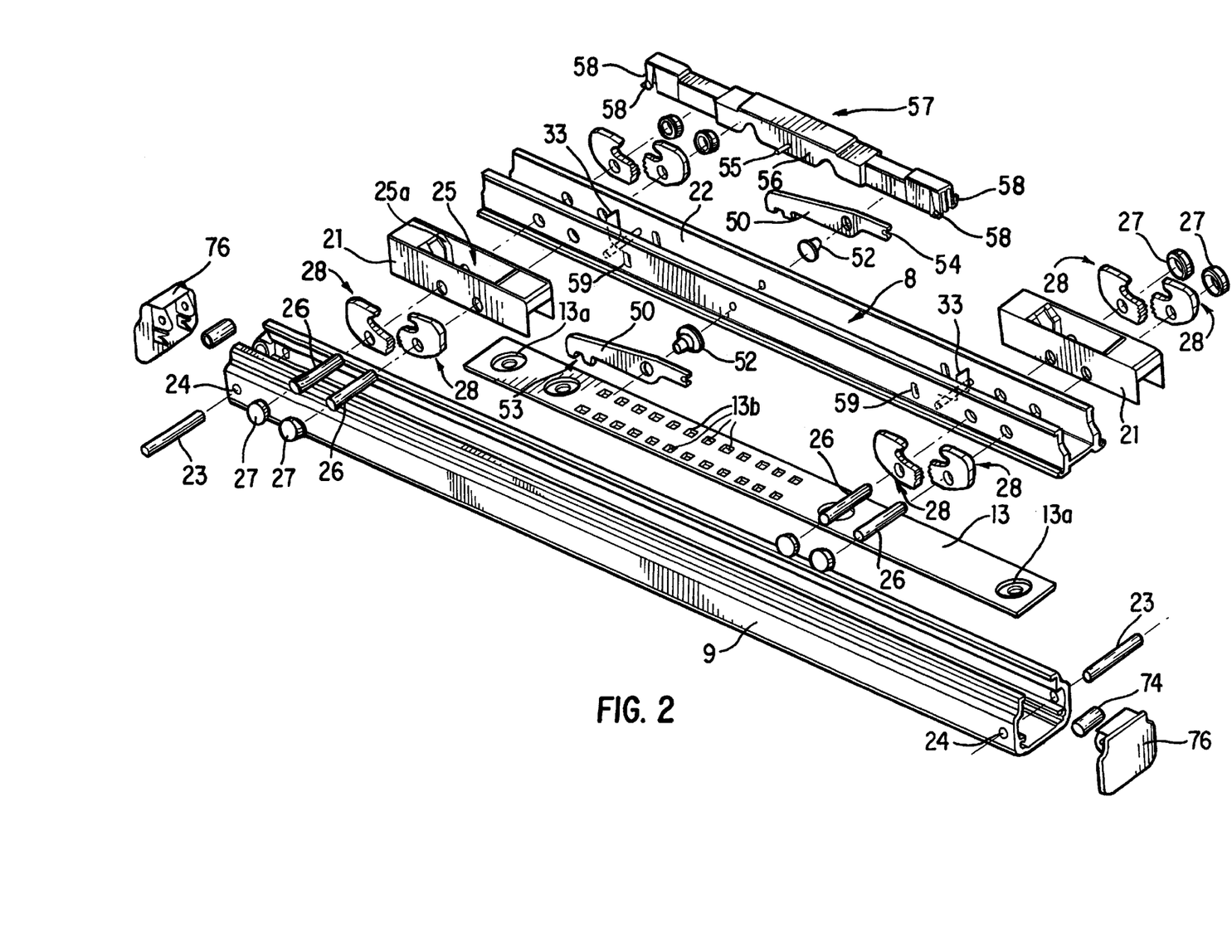
FIG. 2 is an exploded perspective view showing the various components that form part of a slideway and of its runner.
Figure 3:
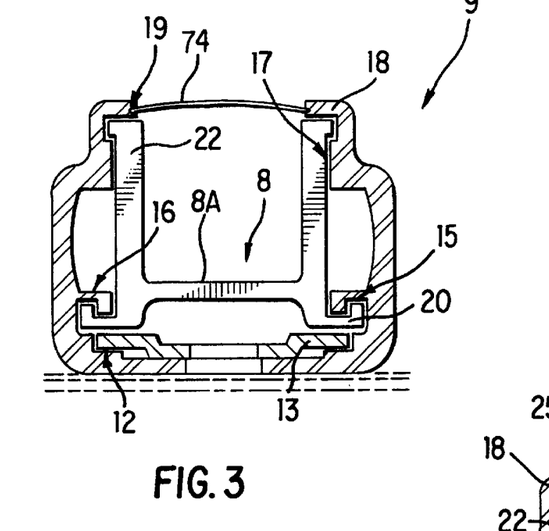
FIGS. 3, 4 and 5 are views in cross section on a larger scale on III—III, IV—IV and V—V of FIG. 6, respectively.

Each slideway therefore consists of a section piece made of light metal alloy, such as aluminum, which, as shown in FIG. 3, in cross section is in the overall shape of a U. Formed in the bottom of the slideway is a groove 12 intended to house a rack 13 made of a strong metal alloy, such as a treated steel. As shown in FIG. 2, this rack has through bores 13a allowing it to be attached to the slideway by bolts 14 which attach this slideway to the floor 14A (shown in dashed lines) of the vehicle, and a double row of perforations 13b forming two sets of teeth, the utility of which will be specified later. The slideway 9 also comprises, from the bottom upward, two opposed bent lower fins 15, two opposed longitudinal grooves 16, a narrowing 17 and two bent upper returns 18, of which the edges that face each other have grooves 19.

As shown in FIG. 3, the runner 8 in cross section has the overall shape of a U, the web 8a of which is extended on each side by two fins 20 which hook together with the lower fins 15 of the slideway, and the two wings 22 of which slide in the narrowing 17 of the slideway, under the bent returns 18. The longitudinal movement of the runner 8 in the slideway 9 is limited by cylindrical pegs 23 (FIGS. 2 and 6) force-fitted into cylindrical bores 24 formed in the walls of the slideway, at each of its ends.

In each of its regions that is to accommodate one of the two legs of a seat, the runner 8 has a housing 21 which, in cross section, has the overall shape of an inverted U and comprises, in its central part, a well 25 with flared edges 25a. This housing, which, for example, is made of a synthetic material, is fixed into the runner by two transverse pins 26 passing through the wings 22 of this runner and each receiving, on their ends that are outside the runner, rollers 27 that can run in the grooves 16 of the slideway.

These pins 26 also constitute articulation pins for catches 28 which, in this embodiment, are, as shown in FIG. 4, arranged more or less in the mid-plane of the slideway and in such a way as to enter the space between the tangs 4a, 4b that make up a leg. In practice, each catch is made up of a group of two juxtaposed tangs, but to simplify the description, the tangs will be considered as constituting a single catch.

Figure 9:
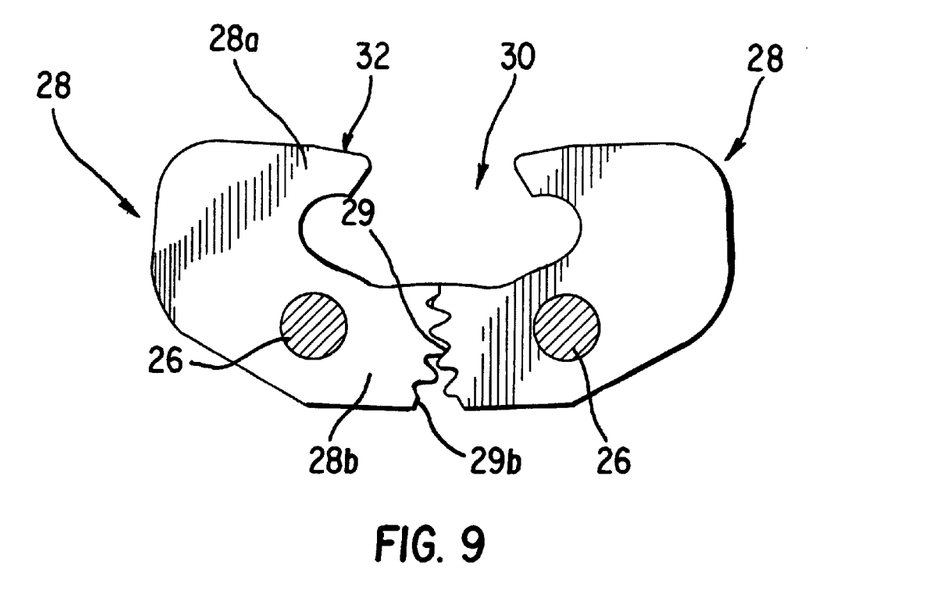
FIGS. 9 and 10 are side views of a set of catches when they are respectively in the fully-closed position and in the fully-open position.
Figure 10:
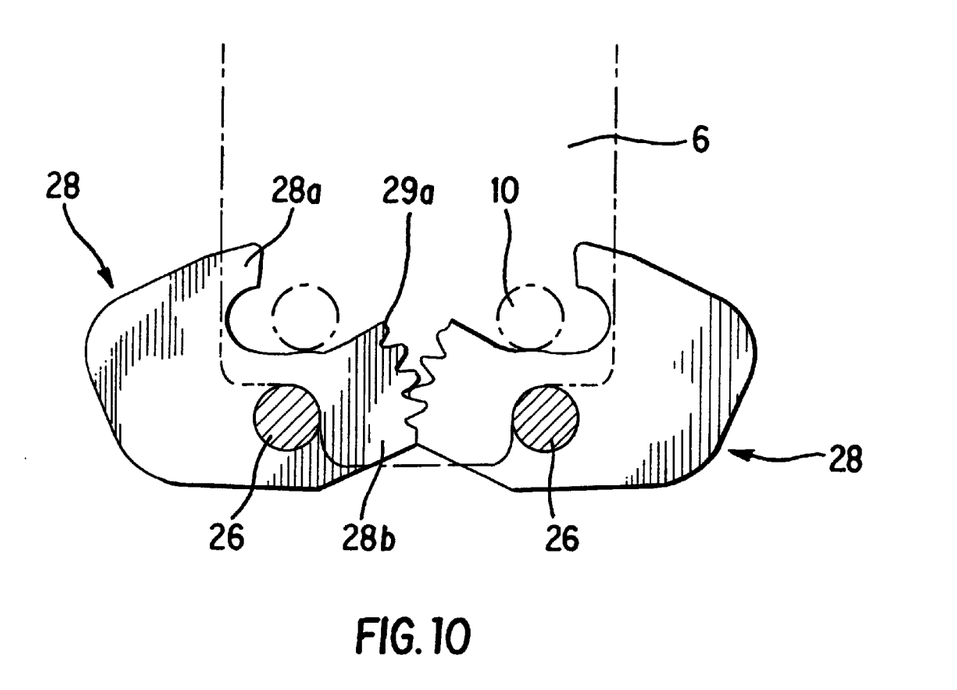

FIGS. 9 and 10 show that the two catches 28 are arranged in opposition on the two pins 26 and each have the shape of a C with unequal wings. Thus, each catch has a long lower wing 28b, the free edge of which has teeth 29 capable of meshing with complementary teeth of the opposite catch. This set of teeth has, at each of its ends, truncated teeth 29a and 29b respectively and which respectively limit the extent to which the short wings 28a of these catches can be brought closer together and moved further apart. These short wings delimit an opening 30 between them and each comprise, on their upper edge, a sloped face 32 extending toward said opening, and the utility of which will be specified later.

Figure 6:
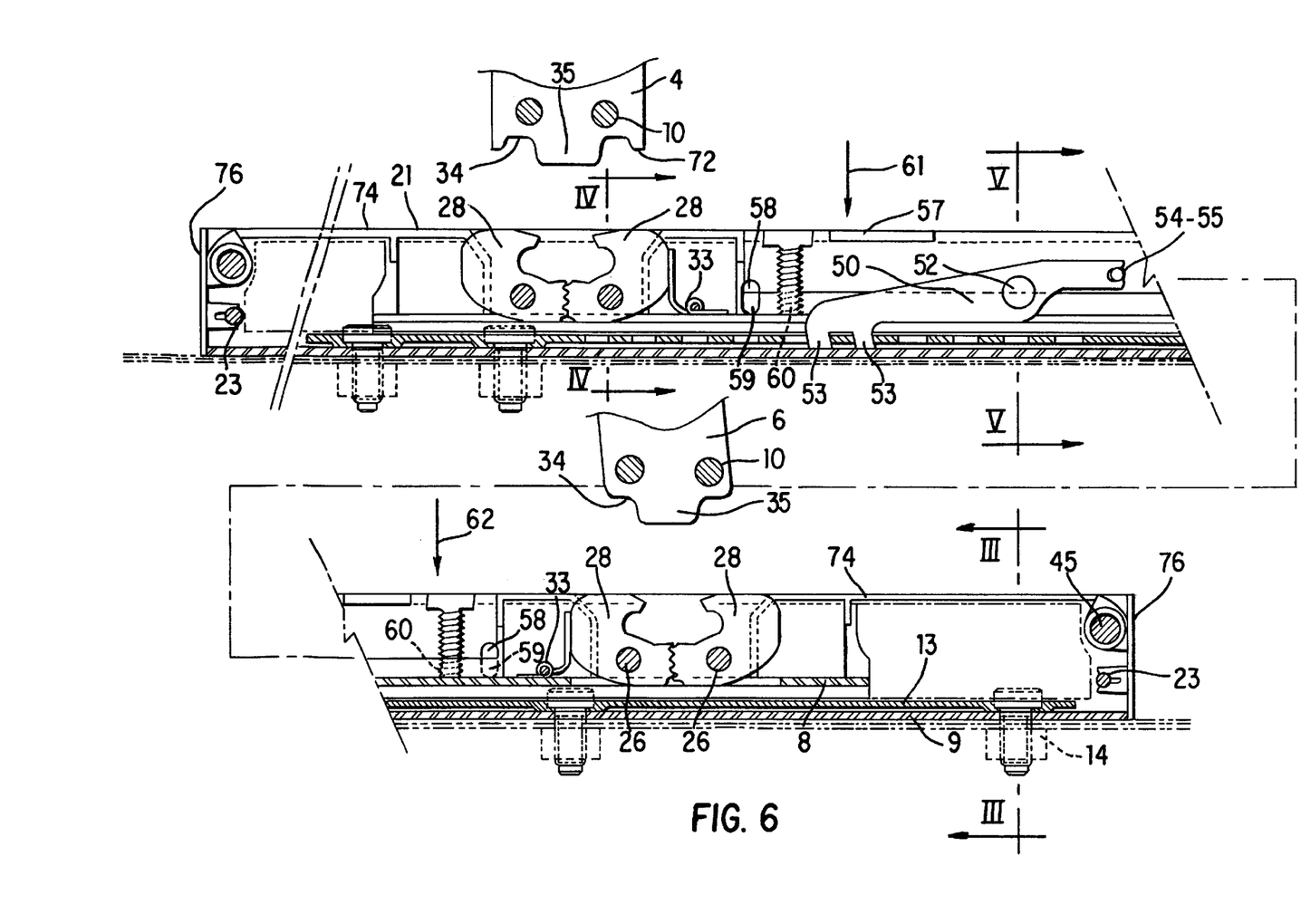
FIG. 6 is a broken view in longitudinal section of one of the slideways with its runner.

Finally, and as shown in FIG. 6, bearing against one of the catches 28 of each set of catches is one of the branches of a hairpin spring 33, the other branch of which bears on the web 8a of the runner 8. In the position of rest, the two sets of catches are in the position depicted in FIGS. 6 and 9, that is to say are fully clamped together under the action of the return spring 33, which makes one of them pivot toward the other and generates a pivoting moment which is transmitted to the other catch via the meshing of the two sets of teeth 29.

Figure 7:
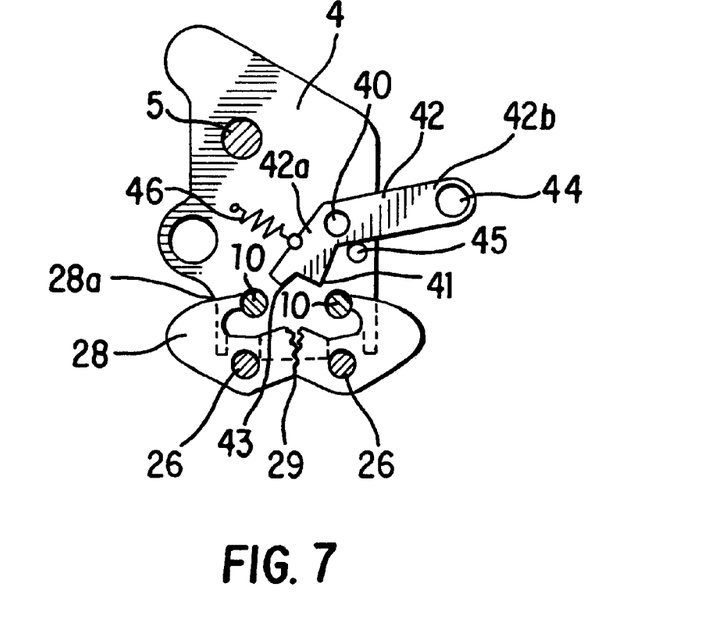
FIGS. 7 and 8 are part views on a larger scale of a front leg and of its catches, respectively in the phase in which the catches are parted, and in the phase in which the retaining fingers are locked by them.

When the legs 4 and 6 of a seat are brought over the accommodating regions formed for them in the runner 8, they are first of all positioned by the flared edges 25a of the wells 25, which has the effect of bringing their retaining fingers 10 into contact with the sloping faces 32 of the catches 28. Under the action of this bearing force, the sloping faces impart to each catch a pivoting moment that tends to increase the size of the opening 30 and does so until, as shown in FIG. 7, the fingers 10 enter the space between the short branches 28a of the catches. As soon as these fingers have reached the hook delimited between the two branches 28a–28b of each catch, the corresponding springs 33 return the catch to the closed position, as shown in FIG. 8, thus hooking onto the retaining fingers 10.

During this engagement, the penetration of the leg 4 into the runner 8 is limited by the contact of an abutment face with a complementary face of the runner. In an embodiment that has not been depicted, the abutment face of each leg consists of its end face 4d which comes into contact with the bottom of the runner.

In the embodiment depicted, the abutment face of each leg consists of two shoulders 34 bordering a tenon 35 formed at the end of the leg. As the leg engages, these shoulders 34 come to bear on the pins 26, as shown in FIG. 8, and this occurs just before the catches 28 re-close. This being the case, the leg is perfectly held vertically and transversely by its retaining fingers 10 and by the pins 26 cooperating with the catches.

Figure 8:
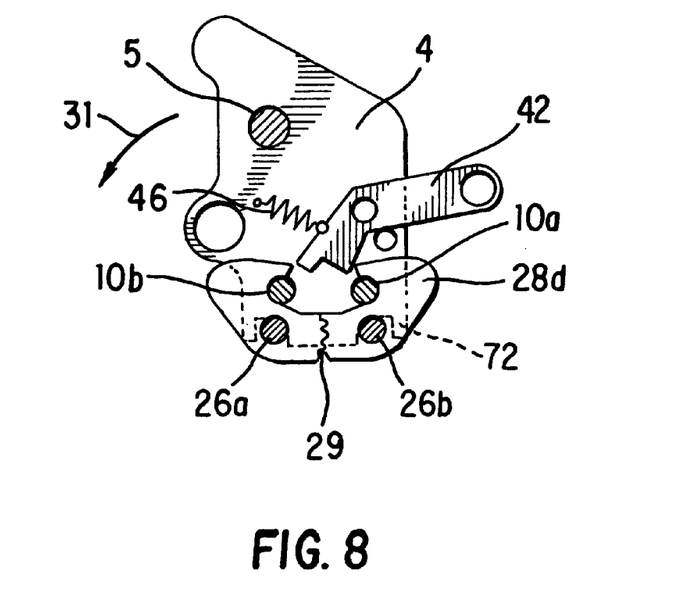

In the event of a frontal impact tending to cause the seat to tip forward, in the direction of arrow 31 in FIG. 8, the pivoting moment transmitted to each leg and tending to make the leg pivot about the front pin 26a in FIG. 8 is canceled by the retaining moment of the rear hook 28d over the rear retaining finger 10a, so that the connection thus obtained superlocks in the event of an impact. The same occurs in the event of a rear impact which then involves the rear pin 26b and the front retaining finger 10b in FIG. 8.

Each of the legs 4 and 6 bears means of manual operation allowing the catches to be unlocked to extract the retaining fingers 10. In the embodiment depicted, each leg comprises, articulated on a transverse pin 40, a lever 42, the lower branch 42a of which has a bearing face 41 capable, as shown in FIG. 8, of coming into contact with the end of the short wing 28a of one of the catches 28 to make this catch pivot in the direction of disengaging it from the corresponding retaining finger. This end is shaped like a step so as to have an abutment face 43 capable, at the end of opening travel, of coming into contact with the corresponding retaining finger in order to limit the pivoting of the catch. The upper branch 42b of the lever 42 is connected by a transverse bar 44 extending under the seat cushion to the lever 42 of the other front leg.

At least one of the levers 42 is brought into the position of rest against a stop 45 of the leg by return means 46 such as a spring.

Figure 1:
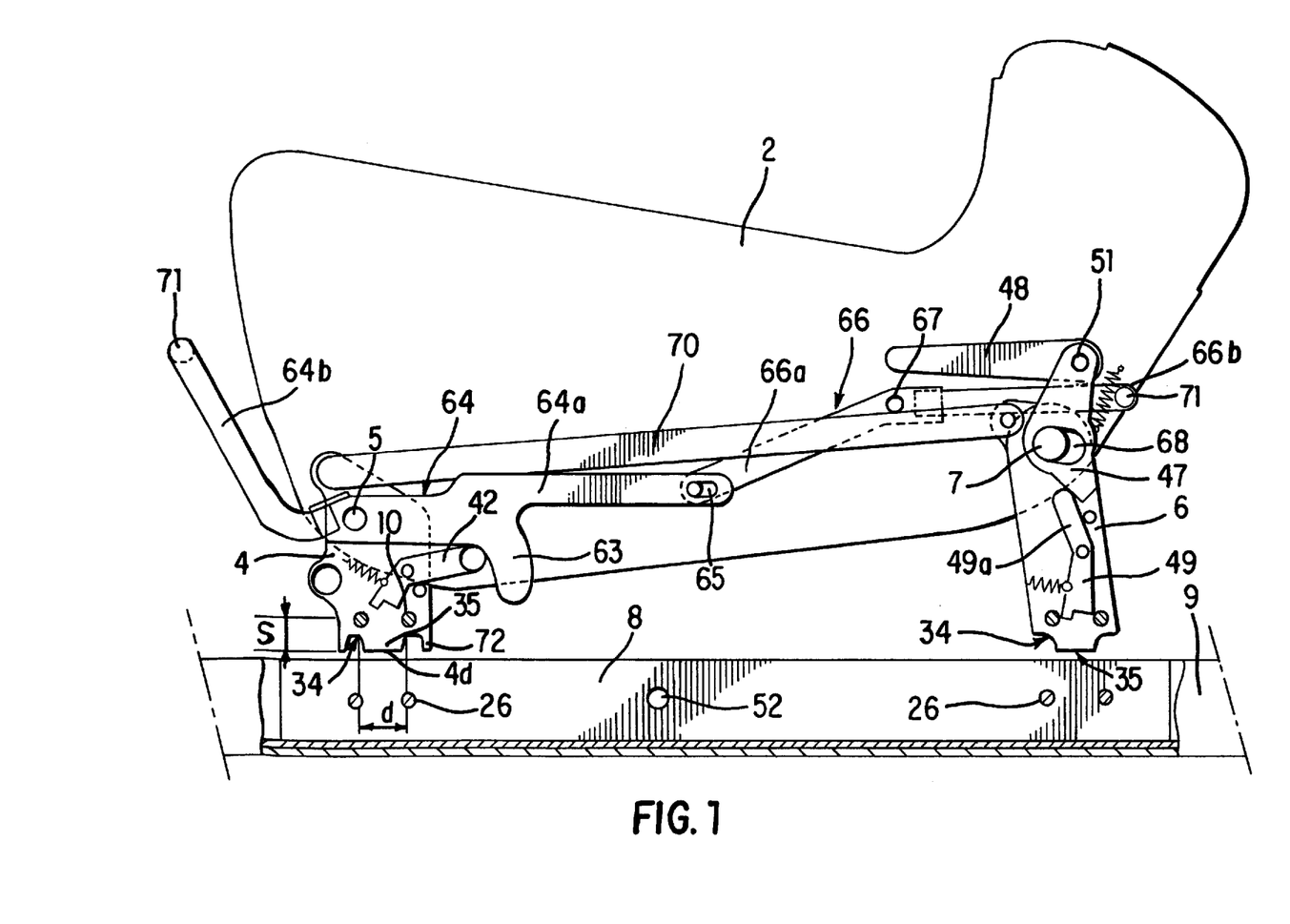
FIG. 1 is a side elevation with partial section showing, in a simplified way, the operating means associated with the seat cushion structure and a slideway with its runner.

FIGS. 1 and 11 show that the rear legs 6 are equipped with levers 49 similar to the ones 42, but the upper branch 49a of which does not constitute the manual control, but bears on an intermediate lever 47 connected to a pin 51 passing through the seat and to which the manual control 48 is also attached. An oblong bore 68 allows movements of the lever with respect to the pin 7 of the leg 6. Each control 48 is connected to the control for the other rear leg by the pin 51.

FIG. 4 shows that when the legs are engaged and locked in their respective runner, the connection is particularly well able to resist being torn out by virtue of the catches 28 bearing on the fingers 10, and by virtue of the articulation of these catches to the pins 26 which, bearing directly on the wings 22 of the runner, transmit the forces they receive to the returns 15 and 18 of the slideway and, via the rollers 27, to the longitudinal grooves 16 of the slideway.

It will be noted that the same results could be obtained by arranging the catches not inside the two tangs 4a, 4b that form a leg, but on each side of these tangs which would then be juxtaposed and would bear retaining fingers that project laterally on each side of them.

This seat is also noteworthy through its means of adjusting its longitudinal position, which means are distributed in the runner 8 and on the seat.

Figure 5:
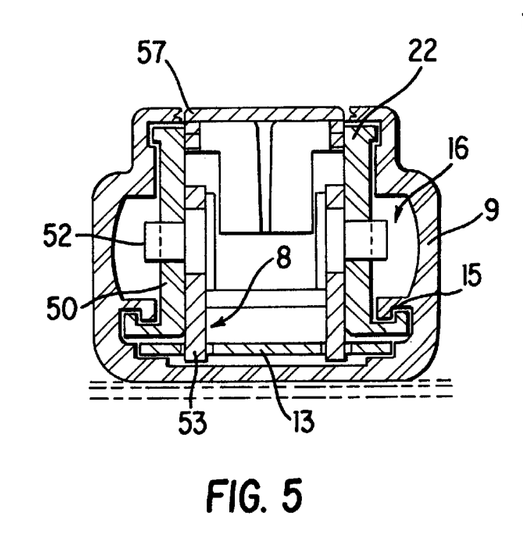

The elements arranged in the runner 8 comprise, in the embodiment depicted and as shown in FIGS. 2, 5 and 6, two levers 50 and a rocker 57. The levers 50 are articulated to the wings 22 of the runner by pivots 52 of the horizontal axis. They comprise, at one of their ends, teeth 53 capable of cooperating with the perforations 13b of the rack 13 and, at their other end, a fork 54. This fork is intended to cooperate with a pin 55, the ends of which are push-fitted into the two lateral wings 56 of the rocker 57. This rocker has a U-shaped cross section and each of its side walls is secured, at each end, to a lateral projection 58 which is mounted to slide in a vertical oblong slot 59 made in the corresponding wing 22 of the runner. Springs 60, arranged near each of the ends of the rocker, bear against the bottom of the runner and under the rocker, bringing the projections 58 into abutment against the upper ends of the oblong slots 59.

It will already have been appreciated that any manual pressure exerted on the upper face of the rocker 57 outside of its axis of pivoting 52, and for example in the direction of the arrow 61 in FIG. 6, will allow this rocker to pivot with respect to its projections 58 which are to the right in FIG. 6 and, as a consequence, to make the lever 50 pivot in the direction of releasing the rack.

This arrangement therefore allows the runner to be moved manually in the slideway, for example to bring it into the chosen position for receiving a seat.

The same result can be obtained by pressing in the direction of the arrow 62 of FIG. 6, because then the rocker pivots with respect to the lateral projections 58 which are arranged to the left in FIG. 6 and cause the lever 50 to pivot in the same direction.

The operating means for unlocking which are arranged on each side of the seat comprise, as shown in FIG. 1, a pusher 63 projecting more or less vertically downward from the inside branch 64a of a lever 64 articulated to the transverse pin 5 of the front legs. The front outside branch 64b of the lever 64 constitutes the operating means proper which is accessible under the front of the seat.

In the embodiment depicted, the branch 64a of the operating lever 64 is coupled, by a sliding connection 65, to the end of the inside branch 66a of another lever 66 which, articulated at 67 to the seat-cushion structure, comprises an operating branch 66b that is accessible from the rear of the seat.

The branches 64b and 66b of the operating device which is arranged on one side of the seat are connected by transverse bars to the corresponding branches of the devices which are arranged on the other side of the seat.

By virtue of this arrangement, it is possible, from the front or from the rear of the seat, for example by pulling the branch 64b upward or the branch 66b downward, to impart a downward vertical movement to the pusher 63, bringing it into contact with the rocker 57 at the place of the arrow 61 of FIG. 6 if the seat is in the position of FIG. 1, or at the place of the arrow 62 if the seat is turned round through 180° with respect to FIG. 1.

It is therefore clear that, with respect to current removable and longitudinally adjustable seats, the seat according to the invention makes it possible, not only to control the longitudinal adjustment, irrespective of whether the seat is facing the front or facing the rear, but also in each of its positions, either from the front or from the rear of the seat, and for this to be achieved without complicating the kinematics.

FIG. 11 shows that by adding a connecting rod 70 between each of the front legs 4 and the corresponding rear leg 6, it is possible, when standing the seat up on its front legs, for the rear legs 6 to be folded into the bulk of the seat.

In this type of seat, to improve the hold afforded by the front legs 4, the shoulders 34 of each of these legs are bordered, on the outside, by bent anti-tilt returns 72.

Figure 12:
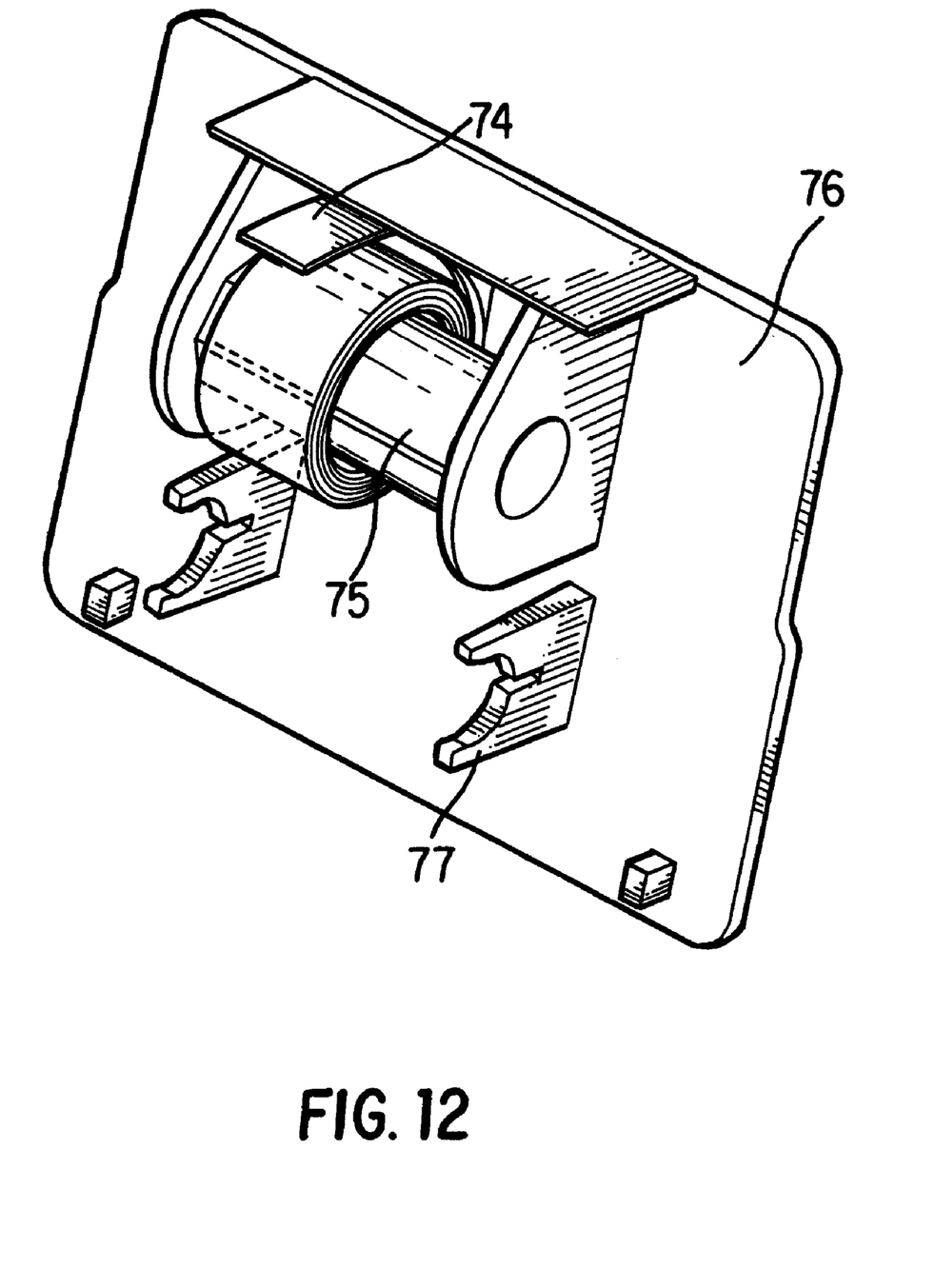
FIG. 12 is a perspective view showing, on a larger scale, one embodiment of a slideway closure piece with a protective-strip winder.

To prevent the ingress of foreign bodies into the slideways 9, attached to each end of each runner 8 is one of the ends of a protective metal strip 74, for example of the tape-measure type. The other end of each strip is engaged over a spring-loaded winder 75 borne by a support 76 closing off the corresponding end of the slideway. As shown in FIG. 12, the support 76 comprises two elastic half-bearings 77 which clip over the pegs 23 that limit the travel of the runner in the slideway. As FIG. 3 shows, the longitudinal edges of each protective strip 74 run in the grooves 19 made in the upper returns 18 of the slideway 9. These grooves give the strip its rigidity and allow it to withstand a localized piercing force of the type exerted by a lady's stiletto heel.

It is clear from the foregoing that, on account of its design, this seat and its means of attachment to the runners make it possible to improve the sizing of the parts and therefore to improve the resistance of the seat with respect to the floor in the event of an accident and also rid the legs of the seat of any presence of catches, thus avoiding the possibility of these catches becoming damaged or soiled. Finally, the judicious positions of the operating means improve the seat-adjustment conditions.

What is claimed is:

1. A removable, reversible and longitudinally adjustable seat for a vehicle, in which, the structure of the seat cushion is secured to four legs in the form of tenons each capable of cooperating with complementary connecting means borne by two runners, these runners being movable and immobilizable with respect to two parallel slideways adapted to be fixed to the floor of the vehicle and, wherein manually-operated catches are returned, by sprung means, to the position of locking the legs to the runners, wherein each of the legs comprises at least one transversely projecting part forming a retaining member, while the corresponding runner comprises, in its region that accommodates each leg, at least one of said manually-operated hook-shaped catch is articulated to said runners and capable of retracting as the projection of the corresponding leg is introduced into the runner, before coming back to hook onto this projection under the action of the hook shaped catches return means, and wherein the manual means of unlocking the catches are borne by each of the legs.

2. The removable seat as claimed in claim 1, wherein each of the legs bears, above its lower end, two transverse cylindrical retaining fingers spaced longitudinally, while each runner comprises, in each of its two regions for accommodating a leg, two C-shaped catches mounted in opposition and with the possibility of rotation on two transverse pins, these two pins passing through the runner and bearing on their ends, protruding from the runner, rollers that roll in longitudinal grooves of the slideways.

3. The seat as claimed in claim 1, wherein the catches are in the shape of a C with unequal wings, the long lower wings of which are toothed and mesh together via teeth that limit their pivoting in both directions, and the short upper wings of which delimit an opening, the upper edges of the short wings being sloped toward this opening so as to generate, when pressed on by the corresponding retaining finger, a turning moment that increases the width of the opening, against the return moment of a spring acting upon one of the catches.

4. The seat as claimed in claim 3, wherein each leg bears an articulated lever kept bearing by a spring on a stop integral with this leg and the lower part of this lever has a bearing face capable, when this articulated lever is pivoted, of coming up against the short upper wing of one of the catches so as to make it pivot in the unlocking direction, and an abutment face capable of coming up against the pin about which the catch rotates in order to restrict the unlocking travel.

5. The seat as claimed in claim 1, wherein the catches cooperating with a leg are arranged in a well for the positioning of this leg, this well having flared edges and being formed in a housing attached into the runner.

6. The seat as claimed in claim 1, wherein each leg comprises an abutment face that limits its vertical engagement in the runner by cooperating with complementary bearing surfaces of the latter.

7. The seat as claimed in claim 6, wherein the abutment face of each leg consists of the end face of the lower end of the leg, and this end face cooperates with a bearing surface consisting of the web of the runner.

8. The seat as claimed in claim 6, wherein the abutment face of each leg consists of the two shoulders of a tenon formed at the lower end of the leg and these two shoulders cooperate with the pins bearing the catches.

9. The seat as claimed in claim 8, wherein, in a seat that can be pivoted on the front legs, the shoulders of each of the front legs are bordered, on the outside, by bent anti-pivot returns.

10. The seat as claimed in claim 1, wherein the means of immobilizing each runner in its slideway comprise:

in the runner, at least one lever articulated to the runner about a transverse pin, and of which one end, passing through the bottom of the runner is toothed to correspond with the teeth of a rack attached in the bottom of the slideway, and a rocker capping the lever, arranged in the runner and bearing a transverse pin for connection with the other end of the aforementioned lever, this rocker being equipped at each end with lateral projections that are mounted so that they can slide in vertical slots in the runner, and with sprung means that press said projections against the upper end of the slots, keeping the teeth of the lever engaged in the rack, and, on the seat-cushion structure, a pusher capable of coming over the rocker of the runner and projecting more or less vertically downward from the inside branch of a lever, said lever being articulated to the seat-cushion structure and comprising an outside branch forming an operating handle, said inside branch of the lever being coupled to the inside branch of another operating lever articulated to the same seat-cushion structure but operable from the other side of the seat.

11. The seat as claimed in claim 1, wherein each of the ends of the runner is connected to the end of a protective metal strip mounted to slide via its edges in grooves opposite each other formed in the slideway, and the other end of which cooperates with a spring-loaded winder borne by a support closing off the corresponding end of the slideway.

* * * * *